(12) United States Patent
Simmons et al.

(10) Patent No.: US 7,943,073 B2
(45) Date of Patent: May 17, 2011

(54) COMPOSITE MATERIALS AND METHOD OF MAKING

(75) Inventors: Kevin L. Simmons, Kennewick, WA (US); Geoffrey M. Wood, North Saanich (CA)

(73) Assignee: Battelle Memorial Institute, Richland, WA (US)

( * ) Notice: Subject to any disclaimer, the term of this patent is extended or adjusted under 35 U.S.C. 154(b) by 1304 days.

(21) Appl. No.: 11/473,642

(22) Filed: Jun. 23, 2006

(65) Prior Publication Data
US 2007/0298236 A1    Dec. 27, 2007

(51) Int. Cl.
*B27N 3/10*    (2006.01)

(52) U.S. Cl. .......................... 264/257; 264/136; 264/137
(58) Field of Classification Search ................. 264/257, 264/136, 137
See application file for complete search history.

(56) References Cited

U.S. PATENT DOCUMENTS

| | | | | |
|---|---|---|---|---|
| 4,287,116 | A * | 9/1981 | Burns | 524/452 |
| 2002/0104423 | A1 * | 8/2002 | Verd | 84/291 |

* cited by examiner

*Primary Examiner* — Lynda Salvatore
(74) *Attorney, Agent, or Firm* — Douglas E. McKinley, Jr.

(57) ABSTRACT

A method for forming improved composite materials using a thermosetting polyester urethane hybrid resin, a closed cavity mold having an internal heat transfer mechanism used in this method, and the composite materials formed by this method having a hybrid of a carbon fiber layer and a fiberglass layer.

13 Claims, 6 Drawing Sheets

COMPOSITE MATERIALS AND METHOD OF MAKING

The invention was made with Government support under Contract DE-AC0676RLO 1830, awarded by the U.S. Department of Energy. The Government has certain rights in the invention.

TECHNICAL FIELD

This invention relates to improved composite materials having improved stiffness, improved durability, lighter weight, and lower manufacturing costs when compared to those presently known in the art. The improved composite materials of the present invention are broadly useful in applications including, but not limited to, consumer goods, durable goods, transportation and recreational goods, building materials, and industrial goods. Exemplary applications for these composite materials range from parts in automobiles, trucks, aircraft and boats, to recreational and sporting equipment, to building materials. The invention also relates to improved methods of manufacture that allow the economical fabrication of these improved composite materials.

BACKGROUND OF THE INVENTION

In many common applications where composite materials are used to form parts, several factors must be considered simultaneously in the manufacturing process. First, these parts, and thus the composite materials that form them, must provide a surface that may be coated with gel coat and/or an application of decorative paint to provide an attractive visual appeal. Thus, the composite materials must have a high quality smooth finish with no defects throughout the surface of the composite materials. Known in the art as a "Class A" finish, in certain applications, this high quality surface is often a prerequisite if the parts formed from these composite materials are to be accepted in the marketplace.

Second, these parts must have sufficient stiffness, strength, and durability to withstand long term exposure to the elements. For example, and not meant to be limiting, composite materials used to form parts used in automotive applications must be engineered to withstand exposure to rain, sun, and wind loading, and composite materials used to form parts used in marine applications must be engineered to withstand forces such as exposure to sunlight and salt water. While increasing the strength and stiffness of a part formed of a composite material can most easily be achieved by simply providing additional composite material, such a strategy typically adds undesirable weight and bulk to the resultant part.

Additional thickness and weight in the part is a direct contradiction of the third consideration which is the desire to minimize the weight of these parts. While generally present in all applications, this need is particularly acute in transportation and marine applications, where lower weight results in an overall product having greater fuel efficiency. The desire to lessen the weight of parts used in these applications is most directly accomplished by producing composite materials having greater strength despite having lesser thickness.

However, even a successful strategy for producing thin, durable, high strength, highly stiff, lightweight parts made from composite materials with excellent finishes is still not sufficient. The precursor materials used to form the composite materials used to make these parts must also be relatively inexpensive, and the process used for making the parts must be highly efficient and consistent such that identical parts may be mass produced at a high rate and with minimum cost in materials and labor, or the parts will prove to be cost prohibitive when compared to those known in the art.

Thus, an ongoing challenge is to find the least cost method to produce the lower weight composite materials with sufficient strength, stiffness and durability to withstand high stress loads and harsh operating environments, all while providing a visually appealing surface finish. The present invention addresses those needs.

SUMMARY OF THE INVENTION

One object of the present invention is therefore to provide improved composite materials having relatively low weight, high stiffness, high durability, and a quality finish when compared to prior art composite materials.

Another object of the present invention is to provide a method for making composite materials with relatively low weight, high stiffness, high durability, and a quality finish when compared to prior art composite materials.

Yet another object of the present invention is to provide a mold for making composite materials with relatively low weight, high stiffness, high durability, and a quality finish when compared to prior art composite materials.

These and other objects are achieved by the present invention: a method for forming improved composite materials, a closed cavity mold (also referred to herein as a cc mold) used in this method, and the composite materials formed thereby.

The composite materials of the present invention are formed of at least one carbon fiber layer, at least one fiberglass layer, and at least one layer of a polymeric flow media which are permeated with a thermosetting polyester urethane hybrid resin, which is then cured to form the layers into solid composite material.

Preferably, but not meant to be limiting, the composite materials of the present invention are formed of first carbon fiber layer and a second carbon fiber layer, a first fiberglass layer and a second fiberglass layer, and a polymeric flow media. The first fiberglass layer and second fiberglass layer are juxtaposed between the first carbon fiber layer and the second carbon fiber layer, and the polymeric flow media juxtaposed between the first fiberglass layer and the second fiberglass layer, such that a sandwich of these materials is formed, as shown in FIG. 1.

These layers are formed into the composite materials of the present invention when they are permeated with a thermosetting polyester urethane hybrid resin, which is preferably flowed through the polymeric flow media, whereupon the thermosetting polyester urethane hybrid resin saturates all of the layers. The resin then cures to form the layers into solid composite material, formed in the shape of the desired part. The thermosetting polyester urethane hybrid resin is made from a polyester resin, an isocyanate resin, a peroxide catalyst, a promoter, and a filler.

Preferably, but not meant to be limiting, the carbon fiber used to form the composite part is a mixture of amorphous carbon and graphitic carbon. Also preferably, but not meant to be limiting, glass and graphite are chopped, and the glass is selected from the group S glass, E glass, C glass.

The present invention also encompasses the method of making the composite materials described above. In one embodiment of the present invention, the method begins by providing a pre-forming mold. The pre-forming mold is simply a mold that allows the various layers to be placed in a position that approximates the desired shape of the final part. As will be recognized by those having ordinary skill in the art, the pre-forming mold can thus be any structure or surface upon which the layers may be placed that allows the layers to be positioned in a manner that approximates the desired shape of the final part. For example, and not meant to be limiting, if the desired part is simply a flat sheet of composite material, the pre-forming mold could consist of something as simple as the flat surface of the top of a table. More complicated, three dimensional parts are preferably formed in correspondingly more complicated three dimensional pre-forming molds, but while the use of such pre-forming molds is preferred, the present invention should be understood to encompass any method or technique that allows the various layers to be placed in a position that approximates the desired shape of the final part.

In a preferred embodiment of the present invention, within the pre-forming mold, the first carbon fiber layer, the second carbon fiber layer, the first fiberglass layer, the second fiberglass layer, and the polymeric flow media are arranged such that the first fiberglass layer and second fiberglass layer are juxtaposed between the first carbon fiber layer and the second carbon fiber layer, and the polymeric flow media is juxtaposed between the first fiberglass layer and the second fiberglass layer, thereby forming a sandwich of these materials, as shown in FIG. 1.

A polymeric binder is applied to the layers, to hold them together when they are removed from the pre-forming mold and placed in the closed cavity mold of the present invention. Preferably, they are placed in a skin that is used as a part of the closed cavity mold of the present invention, however, it should be understood that the present invention specifically contemplates the use of the closed cavity mold with or without the use of the skin.

Within the closed cavity mold, the layers are permeated with the thermosetting polyester urethane hybrid resin which is then cured at a temperature between 35° C. and 60° C. During the curing process, the closed cavity mold controls the maximum variation in temperature within the composite material to within plus or minus 5° C. Once cured, the thermosetting polyester urethane hybrid resin binds together the carbon fiber layer(s), the fiberglass layer(s), and the polymeric flow media into a solid, thin, durable, high strength, highly stiff, lightweight part with an excellent finish. A resultant part formed of these layers, permeated with the thermosetting polyester urethane hybrid resin, and then cured into a solid mass, is defined herein as the "composite material" of the present invention.

Preferably, but not meant to be limiting, the components of the thermosetting polyester urethane hybrid resin are at 35-40° C. prior to injection into the closed cavity mold of the present invention. While not meant to be limiting, this may be accomplished by mixing the polyester resin, promoter, and filler in a static mixer tube. This mixture is then injected into the closed cavity mold. Simultaneously, the isocyanate resin is injected via a separate feed, and the peroxide catalyst is injected via yet another separate feed.

One preferred embodiment of the present invention utilizes a closed cavity mold consisting of three components, a bolster, a skin, and a plug. These components are made of materials having a thermal conductivity of at least 10 W/mK. The plug and bolster of the mold further have a liquid flow through their interior. This liquid flow allows precise temperature control throughout the bolster and the plug, which allows the bolster and the plug to provide even heating to the thermosetting polyester urethane hybrid resin when it is injected into the mold, thereby facilitating the catalytic reaction that forms the composite material. Once the reaction has begun, however, the liquid flow allows the closed cavity mold to act as a heat sink, thereby dissipating the excess heat formed by the reaction.

By acting as both a heat source and a heat sink, the closed cavity mold presents a uniform, controlled temperature across the surface of the composite material, thereby insuring that the catalytic reaction that forms the composite material proceeds at a uniform rate throughout the volume of the composite material.

An important feature of this preferred embodiment of the present invention is the closed cavity mold, or cc mold. In a preferred embodiment shown in FIG. 2, the cc mold consists of three interoperating parts; the plug 2, the skin 3, and the bolster 4. When placed together, these three interoperating parts form a void between the skin and the plug within which the composite material is formed. While it should be recognized that generally the use of the skin 3 will generally allow the cc mold to operate at higher rates of throughput, the present invention should not be limited to this embodiment. Embodiments wherein the cc mold does not include a skin, and wherein the composite material is formed between the plug and the bolster, are expressly contemplated.

The cc mold must accomplish several objectives simultaneously to effectively form the composite materials of the present invention. First, the cc mold defines the shape of the finished composite material that is formed by the present invention. Second, the cc mold must act as a heat source to promote the catalytic reaction that forms, or "cures," the composite material. Once the reaction has begun, however, the cc mold must act as a heat sink, to dissipate the excess heat formed by the reaction. Further, whether acting as a heat source or as a heat sink, the cc mold must present a uniform temperature across the surface of the composite material to insure that the catalytic reaction that forms the composite material proceeds at a uniform rate throughout the volume of the composite material.

By presenting a uniform temperature across the surface of the composite material, the cc mold causes the composite material to cure at a uniform rate throughout the volume of the composite material. This uniform curing is important, because if different portions within the composite material cure at different rates, internal stresses are introduced into the finished composite material. Internal stresses generated by uneven curing will degrade both the strength and the finish of the composite material. Thus, one of the key features of the cc mold of the present invention is that it provides a means whereby the novel composite materials of the present invention may be cured with a uniform and controlled temperature throughout the volume of the composite material.

If the temperature of the cc mold is too low, the composite materials will cure too slowly, thereby decreasing the rate at which the cc mold of the present invention can form composite materials, or the cycle time of the cc mold. Conversely, if the cc mold is allowed to get too hot, as the thermosetting polyester urethane hybrid resin is injected into the cc mold it may cure before it has properly wetted the fiberglass, carbon fiber and polymeric flow media, resulting in defects in the composite materials. In a worst case scenario, if the cc mold is allowed to get too hot, a portion of the thermosetting polyester urethane hybrid resin will cure before it has permeated the entire volume of fiberglass, carbon fiber and polymeric flow media. In this circumstance, the flow of the thermosetting polyester urethane hybrid resin through the polymeric flow media will effectively be clogged, and the composite material will only be partially formed, as a portion of the volume of the fiberglass, carbon fiber and polymeric flow media will not be saturated with the thermosetting polyester urethane hybrid resin.

In embodiments where the skin 3 is used, the skin 3 is placed to form a barrier between the bolster 4 and the composite material. In this manner, the skin 3 prevents the composite material from adhering to the bolster 4. The skin 3 also allow a composite material formed in the cc mold to be removed from the cc mold immediately after the catalytic reaction which forms the composite material is completed. In this manner, the next part to be made of the composite material of the present invention is set up in a separate skin, such that it may be placed in the cc mold immediately after the formation of the previous part, thereby increasing the cycle time of the cc mold by allowing the cc mold to be used to form parts at a much greater rate than would be possible if each part were formed directly on the interior surface of the bolster 4. Rapidly removing the composite materials formed in the cc mold in this manner also helps the bolster and plug of the mold stay at a temperature that allows curing of parts in rapid succession.

Skins 3 are preferably formed from materials that will both readily transfer the heat of the curing reaction to the bolster and plug during curing, and then readily release the finished composite materials after the completion of the curing process. Once the skins have been separated from a finished composite material, they may be re-used to form another part. In addition to releasing easily from the composite material, skins 3 used in the present invention must not frustrate the other purposes of the cc mold. Accordingly, the skins 3 readily conduct heat.

Initially, the skins 3 conduct heat provided by the cc mold to the thermosetting polyester urethane hybrid resin to promote the initiation of the curing reaction. As the thermosetting polyester urethane hybrid resin begins to cure, the skins 3 conduct the heat of the reaction back to the cc mold, which then dissipates the heat, preventing the heat from building up within the bolster and plug of the cc mold.

Whether using a skin or not, during the formation of the composite material of the present invention, the bolster and plug of the cc mold may be held in place by any suitable means, including, without limitation, clamps, bolts, binders, vacuum bags placed about the bolster and plug, or combinations thereof.

BRIEF DESCRIPTION OF THE DRAWINGS

The following detailed description of the embodiments of the invention will be more readily understood when taken in conjunction with the following drawing, wherein.

DETAILED DESCRIPTION OF THE PREFERRED EMBODIMENTS

Figure 1:
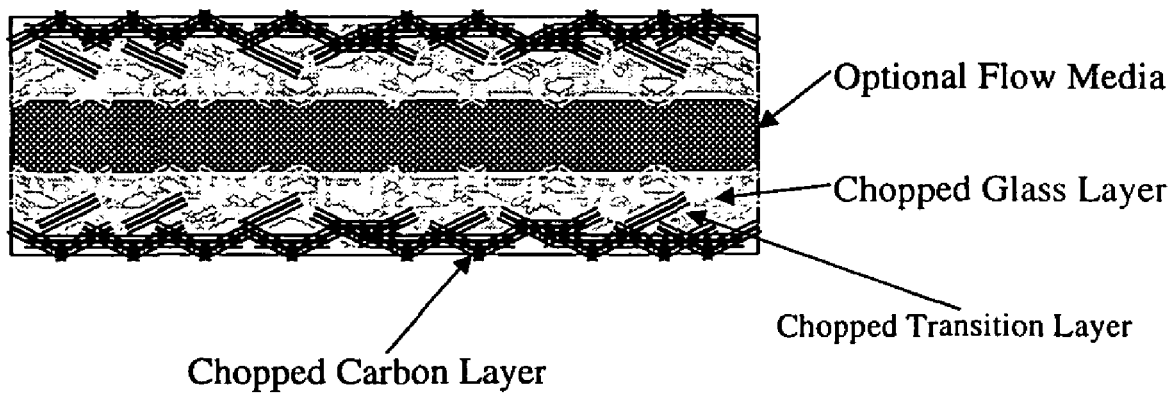
FIG. 1 is an illustration of the arrangement of the first carbon fiber layer, the second carbon fiber layer, the first fiberglass layer, the second fiberglass layer, and the polymeric flow media in a preferred embodiment of the present invention.

For the purposes of promoting an understanding of the principles of the invention, a series of experiments were conducted to demonstrate one embodiment of the present invention. In conducting these experiments, specific materials, proportions, concentrations, ranges, configurations, and other parameters were selected to form not only the cc mold used to demonstrate the present invention, but also the composite material formed therein.

To better enable skilled artisans to make and use this particular embodiment of the present invention, the specific materials, proportions, concentrations, ranges, configurations, and other parameters used in these experiments are faithfully described in the description that follows. However, the applicant's faithful recitation of these various parameters should in no way be construed as an indication that the invention is in any way limited to the specific parameters disclosed. Rather, the specific embodiment is presented as merely an illustrative example of one of many ways the present invention may be practiced, and the present invention should be understood to encompass any and all of the myriad of variations that would be readily apparent to a skilled artisan having the benefit of this disclosure.

For example, while the experiments describe one way of fabricating a cc mold that can act as both a heat source and as a heat sink, those having ordinary skill in the art and the benefit of this disclosure will readily recognize that the specific materials and configuration of the cc mold described herein is but one way of achieving that desired result. As will be apparent to those having ordinary skill in the art, other materials of construction and other configurations of a cc mold could also be used to form an equivalent cc mold that could act as both a heat source and as a heat sink. Accordingly, those having ordinary skill in the art will recognize that one of the benefits of this disclosure is that this disclosure teaches that all cc molds configured to act as both a heat source and as a heat sink will provide the benefit of the present invention, regardless of the specific materials of construction used to form the mold, or configuration of those materials, provided that the specific materials and configuration results in a cc mold that effectively transfers heat and has the capability to act as both a heat source and as a heat sink. Accordingly, all such configurations should be considered as contemplated by claims of the present invention, and the present invention should in no way be limited to the specific materials and configuration presented in the illustrative example which follows.

Further, while the experiments that follow describe one system of a thermosetting polyester urethane hybrid resin that effectively bonds with both fiberglass and carbon fibers, those having ordinary skill in the art and the benefit of this disclosure will readily recognize that the specific components and proportions of the thermosetting polyester urethane hybrid resin are intended merely as an illustrative example of such a system. Accordingly, other systems that depart from the exact components and proportions of the thermosetting polyester urethane hybrid resin described herein, yet which effectively bonds with both fiberglass and carbon fiber, and which falls within the plain limitations set forth in the appended claims, should be considered as contemplated by those claims, and the present invention should in no way be limited to the specific components and proportions of the thermosetting polyester urethane hybrid resin which follows, as these specific components and proportions are presented merely as an illustrative example of the present invention.

For example, the specific filler material used in these experiments was calcium carbonate. Those having ordinary skill in the art and the benefit of this disclosure will recognize that the use of fillers in composite materials is primarily to displace the more expensive resin systems, and to reduce shrinkage associated with those resin systems. Accordingly, a wide range of materials, including, but not limited to silica systems, other systems include silicates, metals, metal oxides, titanates, carbonates, polymers, or any family of systems that fall with in mineral, glass, carbon black, organic, metal. Examples are alumina, titania, wallonstanite, kaolin, rubber particles, polymer particles, diatomaceous earth, clay, aluminum trihydrate, could also be used as fillers. Similarly, the cobalt promoter used in the thermosetting polyester urethane hybrid resin of the present invention is used to assist the peroxide catalyst in curing the polyester and isocyanate resins. As will be recognized by those having ordinary skill in the art and the benefit of this disclosure other suitable promoters would include, but not be limited to, cobalt, lead and manganese salts of octonoates, naphthenates, and linoleates and each of these could also be used as promoters.

In the experiments that demonstrated a preferred embodiment of the present invention, a composite material was formed in a cc mold. The composite material consisted of a first carbon fiber layer, a second carbon fiber layer, a first fiberglass layer, a second fiberglass layer, and a polymeric flow media, arranged as shown in FIG. 1. Generally, it is preferred that the carbon fiber and the fiberglass be chopped to a length between about ½ inches to about 4 inches. For these experiments, the carbon fiber was T700 supplied by Toray, and was chopped to 2 inch length. The fiberglass selected for these experiments was E glass available from suppliers such as Owens Corning and PPG, chopped to 2 inch length.

These layers were placed in the cc mold of the present invention, and permeated with a thermosetting polyester urethane hybrid resin. Generally, the thermosetting polyester urethane hybrid resin of the present invention consists of a polyester resin, an isocyanate resin, a peroxide catalyst, a promoter, and a filler.

The polyester resin is preferably up to about 50% styrene monomer and about 50% unsaturated polyester resin, and more preferably about 33% styrene monomer and about 67% unsaturated polyester resin (all percentages given herein are by weight). For these experiments, the styrene monomer/ unsaturated polyester resin system used was supplied by Reichhold Chemical as Dion® ITP 31638-00.

The isocyanate resin is preferably about 50% Methylenediphenyl Diisocyanate, and about 50% polymeric Diphenylmethane Diisocyanate. The isocyanate resin selected for these experiments was 49% 4,4'-Methylenediphenyl Diisocyanate, and 51% by weight polymeric Diphenylmethane Diisocyanate supplied by Reichhold Chemical as Dion® 31100.

It is preferred that the peroxide catalysts used for the present invention do not contain water. The peroxide catalyst selected for these experiments was about 26.4% tert-Butyl peroxybenzoate, 22.1% Acetylacetone peroxide, 33.5% Diacetone alcohol, and 6.6% Acetylacetone, sold as Trigonox 524 by Akzo Nobel Polymer Chemicals Division.

It is preferred that the promoter used in the present invention be between about 0.1% and about 4.0% Cobalt. In these experiments, Cobalt 2-ethylhexanoate consisting of approximately 65% mineral spirits and about 12% Co sold by Strem Chemicals, Inc. was used.

It is preferred that the filler have a mixture of two sizes of particles, with a mean particle size of between 1 and 1.7 microns, and more preferably 1.7 microns, in the first size, and a mean particle size of about 5 microns for the second size, and a moisture content of less than about 0.25% by weight for both sizes. In these experiments, 99.3% calcium carbonate sold as Optifil T and Optifil JS by JM Huber Corporation were used.

Figure 3:
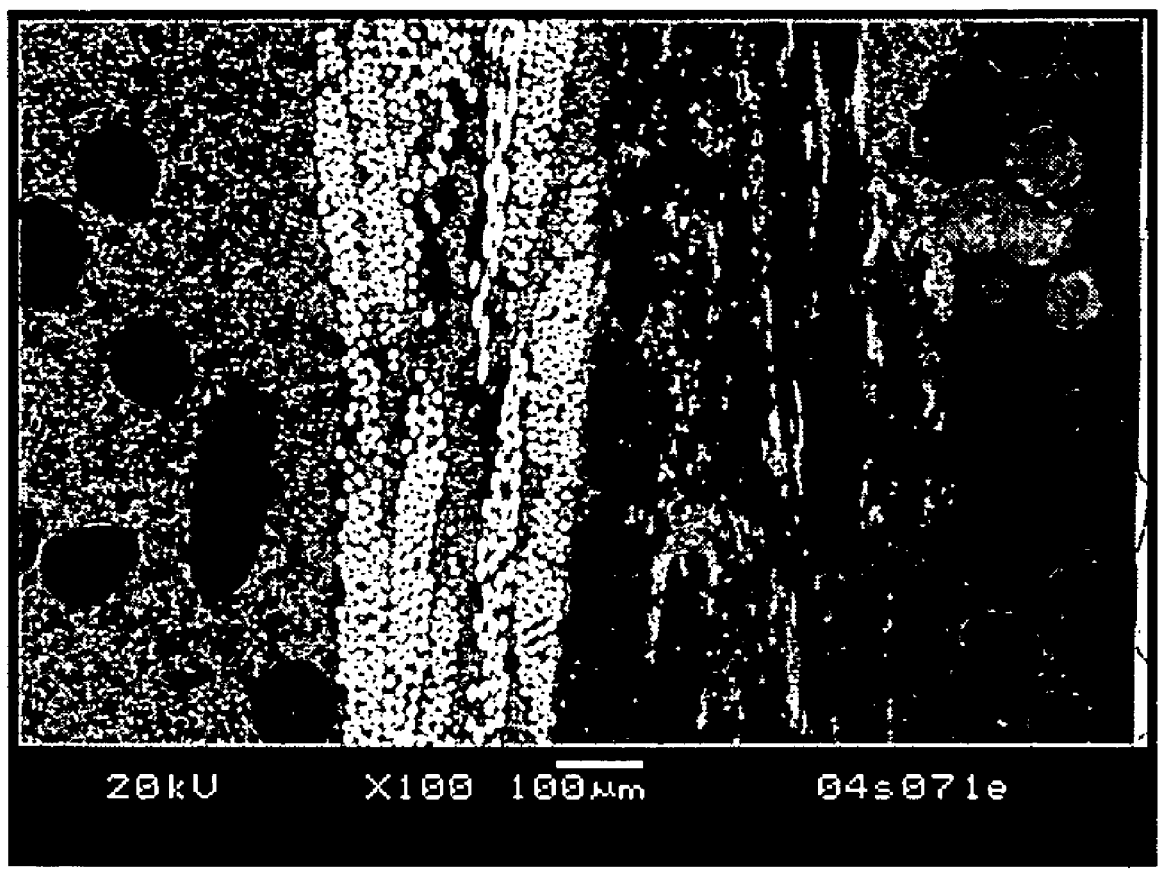
FIG. 3 is an SEM image of a cross section of the composite material made in experiments demonstrating a preferred embodiment of the present invention.

The composite materials made in these experiments thus formed a hybrid of carbon and fiberglass fibers that exhibited the most desired performance capabilities of each of the different fibers, while simultaneously improving the quality of the finish of the surface of the resulting composite material. An SEM image of a cross section of the resulting composite material made in these experiments is shown as FIG. 3. The thermosetting polyester urethane hybrid resin provided adhesion to both of the different types of fibers. This thermosetting polyester urethane hybrid resin had not been previously used for the combination of carbon and fiberglass fibers, and had not been used in a liquid molding application. The use of the calcium carbonate filler enabled the thermosetting polyester urethane hybrid resin to fill in around both the carbon and glass fibers, and significantly enhanced the surface finish of the resultant composite material compared to previous commercial attempts with only carbon composites.

Early attempts to form the composite materials of the present invention indicated that the resin shrinkage between fiber bundles was significant enough so as to provide unacceptable surface quality. Use of fillers is a common practice in the industry to improve surface quality, and generally 40-50% of 5 micrometer or greater calcium carbonate is added to achieve the desired results. Additionally, it is well known that the use of fillers in resin system helps reduce the shrinkage. In order to improve the surface quality properties in order to achieve a class A finish for painting and finishing, calcium carbonate that was less than 2 micron in particle sizes were added. Larger particle sizes can be used, but these tend to filter out in the carbon fiber layer. Thus, by mixing a broader range of two or more fillers with complementary particle sizes that are distributed into a resin matrix stage in the resin transfer molding (RTM) equipment can improve filler concentrations in the carbon fiber layers. Complete dispersion is preferred, and is attained by thorough mixing and recirculation of the particles. Particle sizes are chosen so that they provide an additional phase in the final composite, and preferred particles 1) allow complete and easy flow of the resin system and not increase viscosity unacceptable, 2) do not settle out from the system on holding at low flows and pressures, 3) do not act to inhibit or absorb catalysts or activators in the resin system 4) achieve a particle distribution in the final composite that allows the larger particles to remain in the more porous fraction (typically glass fiber region) while the finer particle size distribution can flow and penetrate into the less porous fraction (typically the carbon fiber region) 5) provide large enough volume fraction in the final composite that significantly lower resin shrinkage is exhibited and 7) provide large enough local volume fraction in and around the carbon composite layer such that local resin shrinkage is small enough that it is not apparent to the visible eye on the surface of the part.

A system of using a finely divided particle size, along with a more standard fiberglass filler was selected to ensure above properties could be met. Particle sizes of nominal 1.7 micrometer and 5 micrometer were mixed to provide the necessary distribution. Calcium carbonate filler materials were initially selected, although others including, but not limited to, including, but not limited to silica systems, other systems include silicates, metals, metal oxides, titanates, carbonates, polymers, or any family of systems that fall with in mineral, glass, carbon black, organic, metal. Examples are alumina, titania, wallonstanite, kaolin, rubber particles, polymer particles, diatomaceous earth, clay, aluminum trihydrate, etc. could be used.

Figure 2:
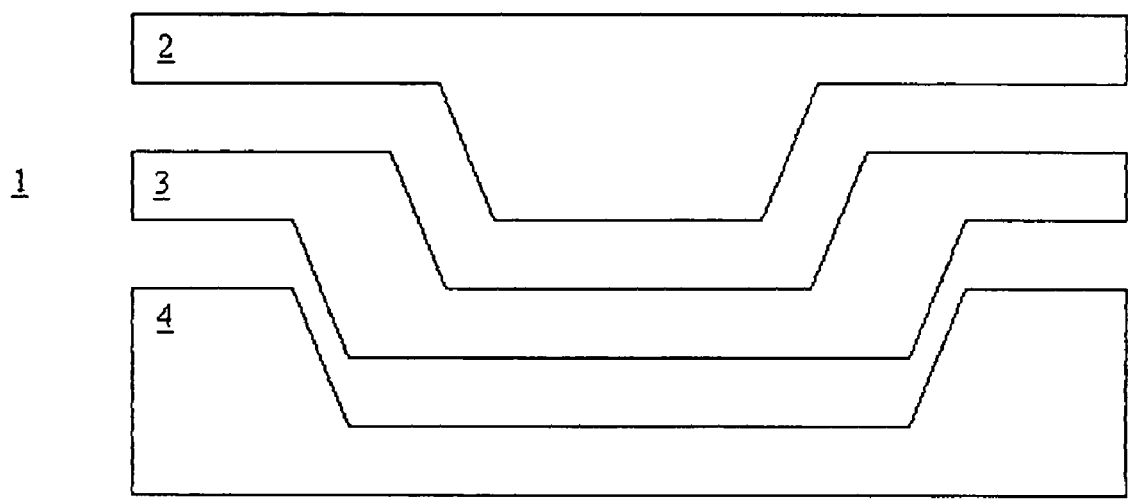
FIG. 2 is an illustration of the arrangement of the bolster, plug, and skin used in a preferred embodiment of the present invention.

As shown in FIG. 2, by adding the surface layer of carbon fiber to an underlying layer of fiberglass, a very high stiffness system is developed, as the carbon is effectively as far from the neutral axis as possible. During formation, the resin flows through the polymeric flow media at the center and out to the surface. The transition zone between the carbon fibers and the fiberglass aids in the transmission of the resin, as the fiberglass effectively acts to wick the resin to the carbon fibers. As shown in FIG. 2, the intersection of the fiberglass and the carbon fibers is preferably not a sudden transition. Rather, it is preferred that a zone where an interpenetrating network of both types of fibers is formed. This transitional zone resolves several issues at once, as it provides the basis for a much improved laminate from mechanical, thermal, and processing standpoints.

Within this transitional zone, a portion of the lower stiffness fiberglass tows, having a larger diameter and higher loft in their dispersion than the carbon fiber tows, will effectively interpenetrate and form channels between the carbon tows. This creates the effect of lowering permeability of the surface layer, allows resin (with particulate reinforcements and fillers) to penetrate the carbon layer and more effectively wet the carbon fibers. It also carries the fillers into the carbon layer, bypassing the carbon fiber effect of filtering out the particulates due to the carbon tow small diameter, and thereby provides the desired effect of reducing resin shrinkage locally and providing a system with much improved surface properties.

The interpenetration of glass fiber (or equivalent lower stiffness fibers) into the carbon layer acts as an off-axis reinforcement, and provides a barrier to shear failure that could otherwise occur at an interface between all-carbon fiber surface laminate and a lower modulus and higher coefficient of thermal expansion interior laminate. A stiffness and coefficient of thermal expansion gradient is also developed to dramatically reduce shear stresses and probability of local failure.

An additional benefit is the ability of resin/fillers to flow to the carbon fiber tows, reducing the need for vacuum during processing (which is generally used as an aid to remove air and reduce micro voids around the carbon fiber.) A secondary benefit is the ability to provide fibers across the carbon to glass transition that will act as crack bridging materials and improve the performance in impact situations.

Figure 4:
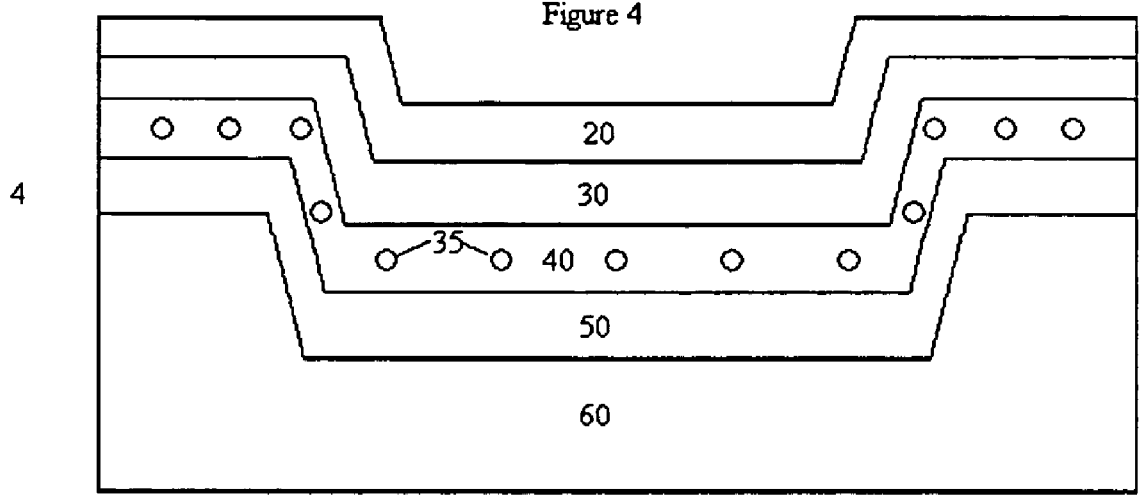
FIG. 4 is an illustration of the bolster showing the layers of material used to construct both the bolster and the plug used in the experiments that demonstrated a preferred embodiment of the present invention.

The plug 2 and the bolster 4 of the cc mold used in these experiments were each constructed using five layers of material. An illustration of the layers is shown in the illustration of the bolster 4 in FIG. 4, which is not to scale. At the surface of the bolster 4 was formed of Adtech ES219 resin and then the filled carbon fiber material system to cover features on the bolster. The plug 2 was formed of a surface coat of styrene resistant mixture (Huntsman RenGel 177-144R/RP1500H aluminum filled) followed by the chopped fiber mix. If the system is not used with a skin and the bolster is used as the other mold half, then the plug 2 and the bolster 4 (bottom mold half) are preferably formed using the same procedure, and the plug 2 is a surface coating 20 which consists of 20% chopped carbon fibers (2 mm) applied over features of the bolster 4 and the plug 2 which could potentially develop voids. The chopped carbon fibers were held in place with a mixture of resin (Adtech EL327 or 337) filled with aluminum and 6% fumed silica was coated with a surface coating of resin 0.75-1.0 mm in thickness (Adtech ES219) also filled with aluminum. The surface coat was brushed on, and no thinner was used.

Just beneath the surface coating 20 is the first carbon layer 30. This layer was fabricated as two coverings of carbon fiber laminate made from 5 Plies carbon fiber and Adtech EL 327 or 337 resin filled with aluminum. The Fiber pack was 5 plies of 373 gsm carbon fabric [0/45/0/45/0]. Alternative fibers could be used, provided they hold the dimensional tolerance and shape.

Underneath the first carbon layer 30 the liquid cooling layer 40 was fabricated. Fluid flow was through copper heating/cooling lines 35 with 3/8" internal diameter and 3" spacing. As will be apparent to those having ordinary skill in the art and the benefit of this disclosure, for any particular cc mold fabricated to practice the present invention, the size and spacing of the heating/cooling lines 35 can be optimized by performing a calculation to balance the liquid flow and heat transfer to any local areas of any particular mold which present a special concern due to the specific geometry of the mold. As will be also apparent to those having ordinary skill in the art and the benefit of this disclosure, for any particular cc mold fabricated to practice the present invention, the heating/cooling lines 35 need not be copper as was used in this example. Any suitable substitute tubing that will transmit heat and fluid can be used.

Heating/cooling lines 35 were embedded in Aluminum filled epoxy casting mix by at least 1/4" of mix Adtech EC433 aluminum filled add up to 6% fumed silica by weight and 30% aluminum particles Adthech N-20 aluminum grain (1/16 to 1/8 inch) to bulk.

Underneath the liquid cooling layer 40 the second carbon layer 50 was fabricated. Second carbon layer 50 utilized the same materials of construction as first carbon layer 30 described above. Finally, the entire bolster was set in a lightweight concrete aggregate 60. The use of the concrete is optional, as mold structures may not need the concrete back fill to maintain their form.

The skin used in the present invention was fabricated by using the plug as a template. The core of the structure is a carbon fiber laminate using a Infusion 8603 resin from Ciba or Mas Infures with 3:1 ratio of Infucure 1G hardener with 40% Mas Fast Hardener as an accelerator. The fiber pack was 5 plies of 373 gsm carbon fabric [0/45/0/45/0] Skin thickness 6-8 m 0.4-0.8 mm/ply (11 oz 5 harness satin weave fabric) >25% vol. A fraction of fiber Tack plies with small amounts of spray adhesive.

The Veil Surface was made from 2.5 oz plain weave glass veil on both sides of the laminate. Preferably, a light carbon veil. This was used against the surface coat to prevent the pre-form from wiping off the gelled surface coat.

The molding Side Surface was coated to a thickness of 0.75-1.0 mm with Huntsman RenGel 177-144R/RP 1500H STYRENE RESISTANT SURFACE COAT ALUMINUM FILLED surface coat, brushed on with no thinner. The back side surface coating was coated to a thickness of 0.75-1.0 mm with a mixture of the laminating resin thickened with silica (Antisag). Preferably, this is applied at the same time as the second molding side surface coat, and the System is MAS Epoxy resin in a 2:1 ratio to Mas Fast hardener.

To apply the resin to the carbon fibers, a double bag system was used. The first bag was sealed against the bolster ~2" below the parting line. The second bag was an envelope. A breather was placed over and under the entire mold assembly. All gaps in the bolster were sealed with tape, and screw heads etc. were dammed off with plasticene. After verifying the vacuum bag integrity, the mold assembly was lightly clamped to permit the resin to flow past the parting line, but the mold gap was held to ~1-2 mm. Infusion proceeded with minimal pressure in the pot, with resin flow moving at ~1 cm/sec in a 5/16" line. No vacuum was used when infusing, as this clamps the mold halves together too tightly to permit resin flow out the parting line. Vacuum was applied when the part was close to or completely wet out to clamp the mold halves and draw out voids.

The resin infusion system required no pre-heat for either system, however optimum infusion occurs at warmer room temperatures, near 85-95° F. It is preferred that the plug and surface coats do not drift in temperature due to overnight cycles. By mix a small amount of pigment in with the resin for visibility when it is flowing through the infusion tube, it is possible to observe the resin's progress infiltrating the carbon fibers.

The preferred skin used in the present invention exhibits very high thermal conductivity, a rapid response rate to thermal excursions, a near-zero thermal expansion coefficient, and is stiffer than fiberglass skins. As a result of these features, this preferred skin limits the dimensional changes during the molding cycle, and provides a system that has increased durability in order to keep the surface of the bolster and plug in excellent condition over the useful life of the bolster and plug, thereby extending the life of the bolster and plug, as well as providing for temperature control of the specific resin system chosen for the molding.

The skin fabricated for these experiments was fabricated from a carbon composite with near-zero coefficient of thermal expansion and a high thermal conductivity.

As described above and shown in FIG. 1, the skin 3 is inserted into the bolster 4 and thereby acts as a movable mold surface. This allows the operations associated with skin and fiber preparation to be done independently of the primary tool and press structure. Skins can be cheaply and easily fabricated off a pattern master and multiple skins can be used to optimize the process matching the press cycle to the number of skins required for the preparation cycle.

The approach of using a carbon skin presents several advantages. First, it allows the skin surface to be dimensionally similar at all temperatures. This ensures that the skin dimensions are similar at application of mold coat, fiber perform, installation in bolster, and during molding and cool-down cycle. Internal stresses and surface dimensional change are thereby eliminated or nearly eliminated. Secondly, it provides for very rapid heat-up and cool-down of the mold cavity as heat is transferred very efficiently through the skins and into the composite material. This works closely in conjunction with the hybrid fiber to ensure consistent and repeatable process cycles and rapid processing capability. Thirdly, the skins are 5-8 times stiffer than a glass fiber typical skin due to the improved stiffness of the carbon fiber over glass fiber and fillers. Large thin skins are more easily handled outside of the bolster, and their lower deflection leads to improved durability and less likelihood of surface cracking of the tooling surface coat. This is a major factor in mold surface quality deterioration of prior art systems which the invention aids in resolving. A related factor is the deflection over time leads to fiberglass molds "patterning through"—a process whereby the repeated flexing of the mold skin causes the fibers near the surface to be forced against the surface and begin to appear in profile. This is eventually passed into the part. The skins used in this preferred embodiment reduce this phenomenon, because of the increased stiffness.

High temperature resin systems with metallic fillers in them were thus selected for fabricating the skins, as these provide even better thermal conductivity and more uniform heating across the skin surface for improve part process and controls. The high temperature resin systems and filler also provide higher heat deflection temperatures and resistance for preform fiber surface damage to the tool while the thermosetting polyester urethane hybrid resin's exothermic reaction is taking place. The high temperature resin system must be able to handle exothermic temperatures greater than 150° C. Filler loadings of up to 30% aluminum filler by weight mixed with the resin were shown to be effective.

Several fillers are suitable for the fabrication of the skins, including but not limited to carbon powder, aluminum powder, aluminum particles and needles, silicon dioxide, and silicon carbide. Skins fabricated in this manner provide the capability to achieve consistent cure times and eliminate local "hot-spots" caused by varying thickness of the resultant composite parts. The process benefits translate into limiting pre-release off the tool surface, and achieving better dimensional control and surface quality.

Figure 5:
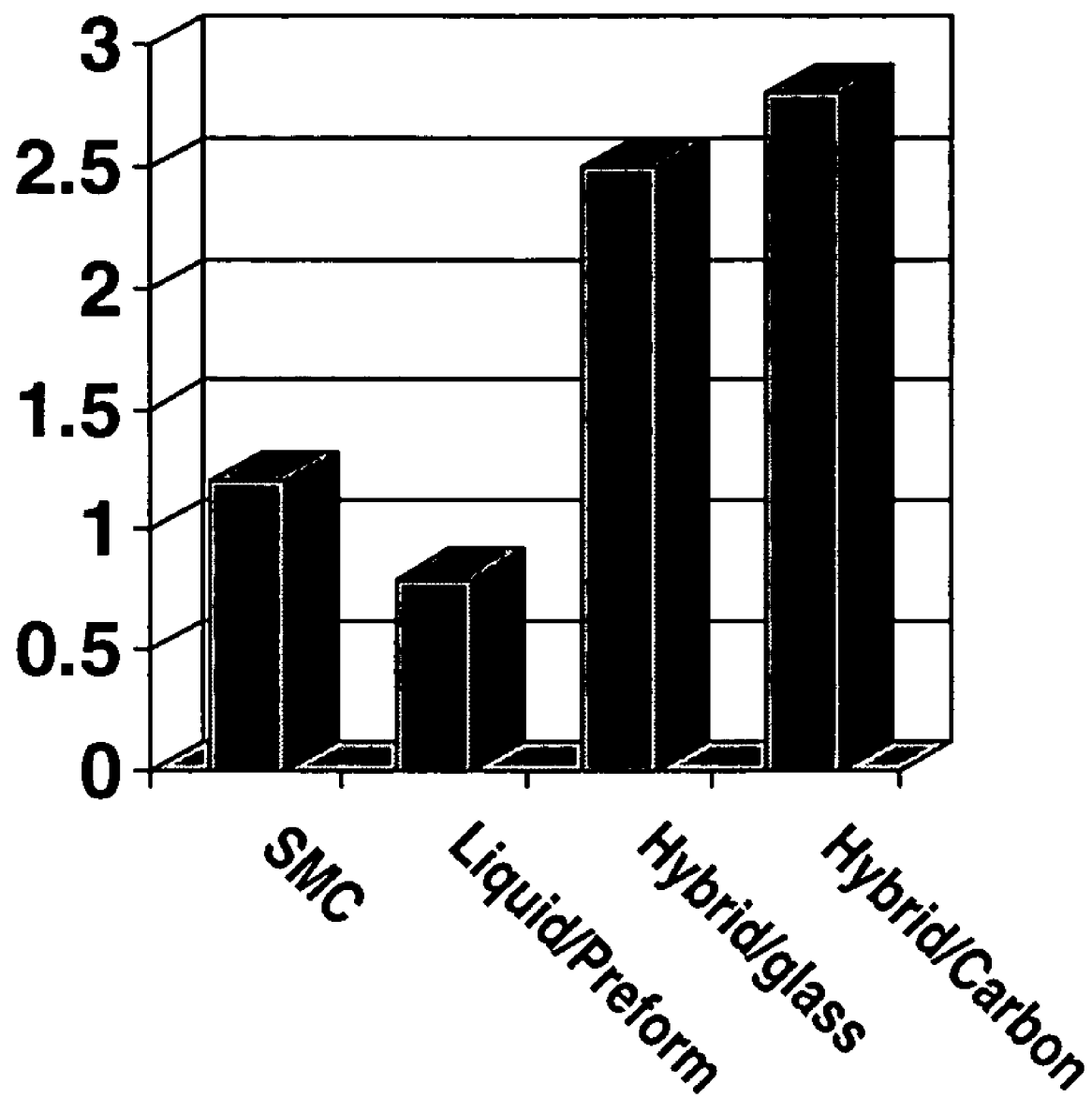
FIG. 5 is a graph showing the results of impact tests conducted on a preferred embodiment of the present invention.

A set of durability and flexure tests were performed on some of the composite materials formed in these experiments. Each of these tests used ASTM standard D790 in a four point bend set up. The durability tested three specimens for failure in 4-point bending. This allowed measurement of the first ply failure of the laminate, and determination of the load under which the surface coating cracked. The results of these tests are shown in FIG. 5.

Figure 6:
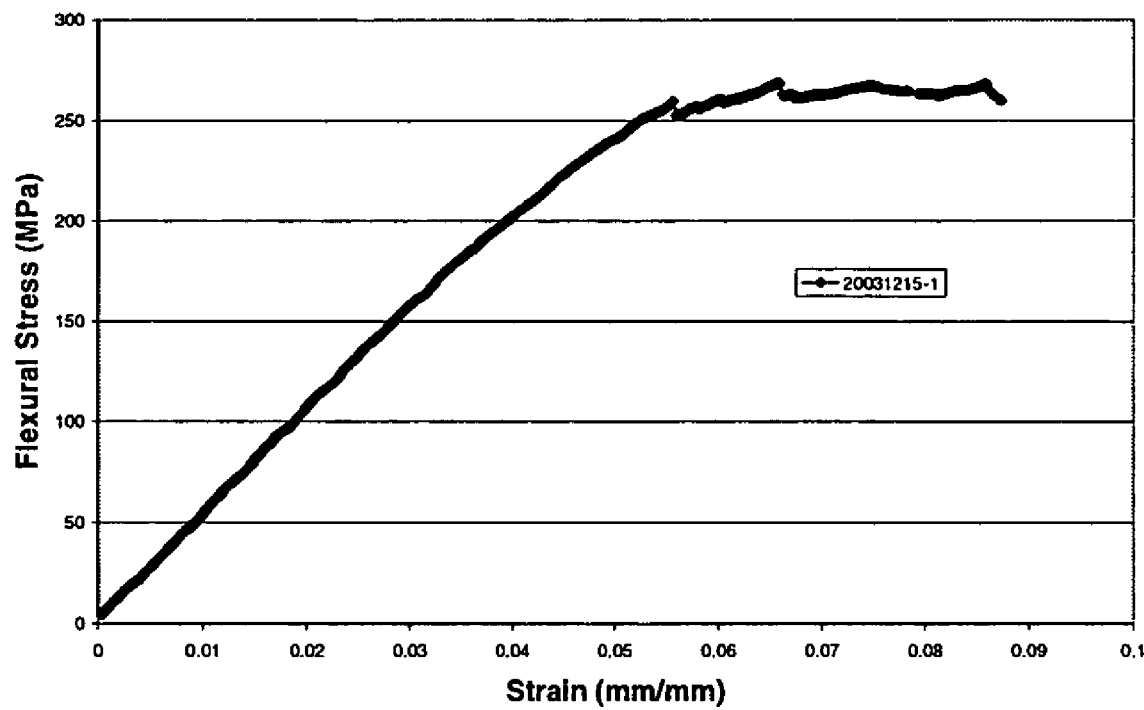
FIG. 6 is a graph showing the flexural stress results of experiments conducted on a preferred embodiment of the present invention.

The composite materials were tested for cyclic fatigue using the same 4-point bend setup and setting the peak load at 30%, 40%, and 50% of the first ply failure average of the durability testing to failure. These samples were then subjected to a three-hertz cyclic fatigue. From the established average from the D790 testing, the samples were fatigue tested at 60%, 50% and 40% of the flexural strength of the sample average. The frequency was set at 1 kHz. The test was stopped after 3 million cycles with the exception of one sample which was stopped at 10 million. There was less than a 5% loss on all samples. The results of these tests are shown in FIG. 6.

Tensile testing was done with ASTM standard D638 type 1 specimen. Tensile strength and tensile modulus were taken from this data set. Archimedes' principle was used for density measurements. Instrumented impact was tested using an Instron Impact tester with a dynatup tip using ASTM standard D3763. The results of these tests and comparison with prior art systems are summarized in Table 1.

| Test | Hybrid system of the present invention | Glass system | CSM Glass UPE | UPE-SMC-R50 | Hybrid Resin SMC-R50 |
|---|---|---|---|---|---|
| SPECIFIC GRAVITY | 1.45 | 1.54 | 1.6-1.7 | 1.9 | 1.9 |
| TENSILE STRENGTH | 85 | 82 | 93 | 120 | 120 |
| TENSILE MODULUS | 9600 | 7800 | 7500 | 22000 | 22000 |
| FLEXURAL STRENGTH MPA | 235 | 200 | 158 | 240 | 310 |
| FLEXURAL MODULUS MPA | 19000 | 11000 | 6100 | 15000 | 15000 |

-continued

| Test | Hybrid system of the present invention | Glass system | CSM Glass UPE | Commercial Systems UPE-SMC-R50 | Hybrid Resin SMC-R50 |
|---|---|---|---|---|---|
| INSTRUMENTED IMPACT J | 2.8 | 2.08 | <0.8 | 0.8 | 3.2 |
| GLASS FIBER CONTENT WEIGHT % | | | 28.5 | 50 | 50 |

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. A method of making a composite material comprising the steps of:
 providing at least one carbon fiber layer,
 providing at least one fiberglass layer,
 providing at least one polymeric flow media,
 placing said layers in a closed cavity mold,
 permeating said layers with a thermosetting polyester urethane hybrid resin comprising:
 a polyester resin at a temperature of between 35° C. and 40° C.,
 an isocyanate resin at a temperature of between 35° C. and 40° C.,
 a peroxide catalyst
 a promoter,
 and a filler,
 and curing said thermosetting polyester urethane hybrid resin at a temperature between 35° C. and 60° C. wherein the closed cavity mold controls the maximum variation in temperature within the composite material during cure to within 5° C.

2. The method of claim 1 wherein said thermosetting polyester urethane hybrid resin is injected into said polymeric flow media from three separate feeds.

3. The method of claim 2 wherein said three separate feeds comprise a first feed of a mixture of the polyester resin, a promoter, a filler, a second feed of the isocyanate resin, and a third feed of the peroxide catalyst.

4. The method of claim 3 wherein the mixture of the polyester resin, promoter, and filler is mixed in a static mixer tube prior to injection.

5. The method of claim 1 wherein said promoter is provided as a cobalt promoter.

6. The method of claim 1 wherein said filler is provided as a calcium carbonate filler.

7. A method of making a composite material comprising the steps of:
 providing a preforming mold,
 within said preforming mold, providing a first carbon fiber layer and a second carbon fiber layer
 providing a first fiberglass layer and a second fiberglass layer juxtaposed between the first carbon fiber layer and the second carbon fiber layer,
 providing a polymeric flow media juxtaposed between the first fiberglass layer and the second fiberglass layer,
 holding said layers together with a polymeric binder,
 removing said layers from said preforming mold and placing said layers in a closed cavity mold,
 permeating said layers with a thermosetting polyester urethane hybrid resin comprising:
 a polyester resin
 an isocyanate resin
 a peroxide catalyst
 a promoter,
 and a filler,
 and curing said thermosetting polyester urethane hybrid resin at a temperature between 35° C. and 60° C. wherein the closed cavity mold controls the maximum variation in temperature within the composite material during cure to within 5° C.

8. The method of claim 7 wherein said a polyester resin and said isocyanate resin are at a temperature of between 35° C. and 40° C. prior to permeating said layers.

9. The method of claim 7 wherein said thermosetting polyester urethane hybrid resin is injected into said polymeric flow media from three separate feeds.

10. The method of claim 9 wherein said three separate feeds comprise a first feed of a mixture of the polyester resin, promoter, and filler, a second feed of the isocyanate resin, and a third feed of the peroxide catalyst.

11. The method of claim 10 wherein the mixture of the polyester resin, promoter, and filler is mixed in a static mixer tube prior to injection.

12. The method of claim 7 wherein said promoter is provided as a cobalt promoter.

13. The method of claim 7 wherein said filler is provided as a calcium carbonate filler.

* * * * *